United States Patent [19]

Katchman et al.

[11] 4,128,603

[45] Dec. 5, 1978

[54] COMPOSITIONS COMPRISING POLYPHENYLENE ETHER AND RUBBER MODIFIED POLYSTYRENE

[75] Inventors: Arthur Katchman, Delmar; Gim F. Lee, Jr., Albany, both of N.Y.

[73] Assignee: General Electric Company, Pittsfield, Mass.

[21] Appl. No.: 809,441

[22] Filed: Jun. 23, 1977

Related U.S. Application Data

[63] Continuation of Ser. No. 489,509, Jul. 18, 1974, abandoned, which is a continuation-in-part of Ser. No. 139,215, Apr. 30, 1971, abandoned, which is a continuation-in-part of Ser. No. 31,793, Apr. 24, 1970, abandoned.

[51] Int. Cl.$^2$ .............................................. C08L 51/04
[52] U.S. Cl. .................................................. 260/876 R
[58] Field of Search ..................................... 260/876 R

[56] References Cited

U.S. PATENT DOCUMENTS

| | | | |
|---|---|---|---|
| 3,383,435 | 5/1968 | Cizek ..................................... | 260/874 |
| 3,487,127 | 12/1969 | Erchak et al. ......................... | 260/876 |

FOREIGN PATENT DOCUMENTS

| | | | |
|---|---|---|---|
| 564274 | 10/1958 | Canada ..................................... | 260/880 |
| 824368 | 11/1959 | United Kingdom ..................... | 260/880 |
| 1013393 | 12/1965 | United Kingdom ..................... | 260/880 |

*Primary Examiner*—Carman J. Seccuro
*Attorney, Agent, or Firm*—Morgan, Finnegan, Pine, Foley & Lee

[57] ABSTRACT

There are provided high impact strength thermoplastic compositions comprising a polyphenylene ether and a rubber modified polystyrene resin having not less than 22% by weight of a dispersed elastomeric gel phase. Such elastomeric particles, when dispersed in a martrix of polyphenylene ether and polystyrene, provide molded articles with substantial and unexpected improvements in impact resistance, surface appearance and resistance to aggressive solvent systems in comparison with known compositions made from rubber modified polystyrenes having dispersed elastomeric gel contents of less than 21% by weight.

14 Claims, No Drawings

COMPOSITIONS COMPRISING POLYPHENYLENE ETHER AND RUBBER MODIFIED POLYSTYRENE

CROSS-REFERENCE TO RELATED APPLICATION

This is a continuation of application Ser. No. 489,509 filed July 18, 1974 which is a continuation-in-part of Ser. No. 139,215, filed Apr. 30, 1971, which in turn is a continuation-in-part of Ser. No. 31,793, filed Apr. 24, 1970, all now abandoned.

This invention relates to thermoplastic resin compositions and, more particularly, to high impact thermoplastic compositions comprising a polyphenylene ether and a rubber modified polystyrene resin having elastomeric gel content of greater than 22% by weight.

BACKGROUND OF THE INVENTION

The polyphenylene ethers are known and described in numerous publications, including Hay, U.S. Pat. No. Nos. 3,306,874 and 3,306,875; and Stamatoff, U.S. Pat. Nos. 3,257,357 and 3,257,358, all incorporated herein by reference. They are useful for many commercial applications requiring high temperature resistance and, because they are thermoplastic, they can be formed into films, fibers and molded articles. In spite of these desirable properties, parts molded from polyphenylene ethers are somewhat brittle due to poor impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

It is known in the art that the properties of the polyphenylene ethers can be materially altered by forming compositions with other polymers. For example, Finholt, U.S. Pat. No. 3,379,792, discloses that flow properties of polyphenylene ethers are improved by preparing a composition thereof with from about 0.1 to 25 parts by weight of a polyamide. In Gowan, U.S. Pat. No. 3,361,851, polyphenylene ethers are formed into compositions with polyolefins to improve impact strength and resistance to aggressive solvents. In Cizek, U.S. Pat. No. 3,383,435, incorporated herein by reference, Fox, U.S. Pat. No. 3,356,761, and Bostick et al, French Pat. No. 1,586,729, there are provided means to simultaneously improve the melt processability of the polyphenylene ethers and upgrade many properties of polystyrene reins. These patents disclose that polyphenylene ethers and vinyl materials, e.g., blended or grafted polystyrene resins, including many modified polystyrenes, are combinable in all proportions to provide compositions having many properties improved over those of either of the components. This invention provides compositions of the type disclosed broadly in such prior art, but with unexpectedly high impact strength.

Preferred embodiments of the Cizek patent are compositions comprising a rubber modified high-impact polystyrene and a poly(2,6-dialkyl-1,4-phenylene)ether. Such compositions are important commecially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide predetermined properties ranging between those of the polystyrene resin and those of the polyphenylene ether by controlling the ratio of the two polymers. The reason for this is that the Cizek compositions exhibit a single set of thermodynamic properties rather than the two distinct sets of properties, i.e., one for each of the components of the compositions, as is typical with compositions or blends of the prior art.

The preferred embodiment of the Cizek patent is disclosed to comprise poly(2,6-dimethyl-1,4-phenylene) ether and a rubber modified high-impact polystyrene (identified in Example 7 as Lustrex HT88-1 of Monsanto Chemical Company). It is known in the art that Monsanto HT-88 high impact polystyrene contains an elastomeric gel phase dispersed through a polystyrene matrix and that this elastomeric phase comprises about 12-21% by weight of the composition. A 20.7% gel content is shown, e.g., in Table 3 in Vol. 13, Encyclopedia of Polymer Science and Technology, 1970, p. 401 et seq. Thus the preferred embodiment of the Cizek patent, which was disclosed to have a notched Izod impact strength ranging from 1.05 to 1.5 ft.lbs./in. notch (Standard Method, ASTM-D-256) comprised a polyphenylene ether and a rubber modified high-impact polystyrene resin, the polystyrene containing less than 21% by weight of a dispersed elastomeric gel phase. In addition, it is known that in the gel free polystyrene matrix in Lustrex 88, the weight average molecular weight, $\overline{M}_w$, is about 251,000 and the number average molecular weight, $\overline{M}_n$, is about 73,000, and, therefore, the polydispersity, i.e., the ratio $\overline{M}_w/\overline{M}_n$ is about 3.44.

It is generally recognized that the properties of impact resistant polystyrenes are highly dependent on the number, size and character of dispersed elastomeric particles. Moreover, while most commercial impact polystyrenes contain from 3 to 10% by weight of polybutadiene or rubbery butadiene-styrene copolymer, polystyrene grafted or occluded in the rubber particles gives rise to a gel content, i.e., fraction of the reinforcing rubber (elastomer) phase of 10–40%. Means are known to vary the gel content, while holding the rubber content constant, generally comprising stirring a mixture of styrene monomer and rubber during the early stages of polymerization, rapid stirring giving the lowest gel content and slower stirring giving progressively greater gel content and with no stirring at all, the gel content is >80%. Means are also known to vary the molecular weight distribution, i.e., polydispersity, of the polystyrene matrix. Generally, longer polymerization time at lower catalyst levels and more moderate temperatures provided the highest ratio of $\overline{M}_w/\overline{M}_n$, i.e., the low molecular weight polystyrene fraction is decreased by such techniques. With respect to gel content, it has been the desired objective to maintain this relatively low, and, it is to be noted that the high impact polystyrene used in Cizek's optimum compositions has a gel content of 12 to 20.7% by weight. As to the molecular weight distribution of polystyrene in the matrix, i.e., polydispersity, it has also been the desired objective to keep this narrow to minimize the amount of low molecular weight "tail" fraction which lowers mechanical properties, especially impact strength. The high impact polystyrene used in Cizek's optimum compositions has a polydispersity of below 3.5, i.e., 3.44, see the above citation.

In the present state of the art, therefore, compositions of polyphenylene ethers and rubber modified styrene resins are known, in which the polystyrene resin contains a dispersed elastomeric gel phase of 12 to 20.7% by weight, and which have a notched Izod impact strength of from 1.05 to 1.5 ft.lbs./in. notch. It is also known that in the particular rubber modified polystyrene used, the polydispersity of the gel-free polystyrene matrix, $\overline{M}_w/\overline{M}_n$, is 3.44.

In view of the above, it has now unexpectedly been found that compositions of a polyphenylene ether with a rubber modified polystyrene resin can be provided with substantially improved impact strengths if the dispersed elastomeric gel phase comprises at least 22% by weight of the rubber modified polystyrene. It is preferred that the gel free polystyrene in the matrix have a broad molecular weight distribution, too. The polydispersity ($\overline{M}_w/\overline{M}_n$) should be not less than about 3.5, in contrast to the maximum of 3.44 used in the prior art. The impact strengths of the present compositions are substantially higher than those of comparable compositions wherein the gel content of the rubber modified high impact polystyrene is from 12 to about 21%, i.e., within the range disclosed in the prior art. In addition, the surface appearance, especially gloss, is unexpectedly improved, as is the resistance to aggressive solvents, such as gasoline.

DESCRIPTION OF THE INVENTION

According to the present invention, in its broadest aspects, there are provided thermoplastic compositions with unexpectedly high impact resistance comprising a polyphenylene ether, and a rubber modified polystyrene, the polystyrene containing at least 22% by weight of a particulate gel phase dispersed in a polystyrene matrix. Preferably, the polystyrene in the matrix has a broad molecular weight distribution, with a polydispersity of at least 3.5. In general, the compositions according to this invention are prepared by combining said polyphenylene ether and a rubber modified polystyrene to obtain a composition having at least two phases, one of which is discontinuous and comprises rubber gel particles. Such compositions may be molded to shape using conventional molding procedures.

Therefore, according to a preferred aspect of this invention, there are provided high impact strength thermoplastic compositions comprising
(a) a polyphenylene ether and
(b) a rubber modified polystyrene resin, said rubber modified polystyrene containing not less than about 22% by weight of an elastomeric gel phase dispersed in a polystyrene matrix. Preferably the gel phase comprises from about 22 to about 80%, more preferably, from 22 to about 30%, and most preferably from 23.5 to about 25.5% by weight of the rubber modified polystyrene.

Methods to determine the gel content are well known to those skilled in the art. One convenient method comprises separating the gel phase from the rubber modified polystyrene by high speed centrifugation. A 5% by weight suspension of rubber modified polystyrene is kept in contact with a mixture of methyl ethyl ketone and acetone (50/50 by volume) for 90 minutes with mild shaking. Then it is centrifuged at 47,000 × G (19,500 r.p.m.) at 10° C. The gel phase is recovered by decanting and vacuum drying at 50° C. The gel content is the percent by weight of dried gel based on the original weight of the rubber modified polystyrene.

As has been mentioned, preferred compositions are made from rubber modified polystyrene in which the styrene phase has a polydispersity of greater than 3.5 and, especially preferably, from about 3.5 to about 5.0. The term polydispersity means the ratio of weight average molecular weight to number average molecular weight — the higher the ratio, the broader the range of molecular weights.

Polydispersity can be determined in ways known to those skilled in the art. For example, the soluble rigid polystyrene resin phase can be precipitated with methanol from the centrifugate prepared as described above and the ratio is measured by gel permeation chromatography.

The compositions of this invention generally consist of a mixture of two phases, the continuous phase being a matrix of polyphenylene oxide resin and styrene resin in which there is a discontinuous gel phase dispersed comprising particles of elastomer. Such particles may also include to varying extents polyphenylene ether resins, depending upon how the compositions are prepared. In general, it is preferred that they include a minor proportion, e.g., up to about 50% by weight of ungrafted polystyrene. In a typical particle there may be, for example, about 20% by weight of rubber, about 10%, or more by weight of grafted polystyrene and up to about 50% by weight of occluded, ungrafted styrene resin.

The present compositions are prepared by combining a rubber modified polystyrene resin with the polyphenylene ether. The particles of the elastomer are provided, e.g., by polymerizing styrene in the presence of dissolved rubber under well known conditions whereby a dispersed microgel of, e.g., polystyrene grafted, crosslinked rubber particles becomes dispersed in a polystyrene matrix. This is then combined with the polyphenylene ether and the rubber gel volume in the final composition is directly related to the amount of rubber modified polystyrene used.

The polyphenylene ethers with which this invention is concerned are fully described in the above-mentioned references. The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula:

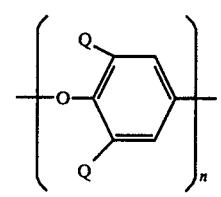

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary α-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly-(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like. Examples of polyphenylene ethers corresponding to the above formula can be found in the above referenced patents of Hay and Stamatoff.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with polystyrene resins over the entire range of combining ratios.

In the present compositions, the polyphenylene ether is combined with a rubber-modified polystyrene. Suitable polystyrene matrix resins are shown in Cizek, U.S. Pat. No. 3,383,435. Such resins will be combinable with the polyphenylene ether and, in general, will be selected from those having at least 25% by weight of the polymer units derived from a vinyl aromatic monomer, e.g., one having the formula:

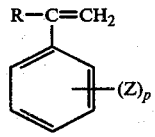

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene resins include homopolymers of polystyrene; polychlorostyrene; poly-α-methylstyrene; and the like; styrene-containing copolymers, such as styrene-acrylonitrile copolymers; copolymers of ethylvinylbenzene and divinylbenzene; styrene-acrylonitrile-α-methylstyrene terpolymers; and the like. Preferred polystyrene resins of this class are homopolystyrene; poly-α-methylstyrene; styrene-acrylonitrile copolymers; styrene-α-methylstyrene copolymer; styrene-methyl methacrylate copolymer; and poly-α-chlorostyrene. Especially preferred is homopolystyrene.

The "rubber" used to modify the polystyrene resin includes polymeric materials, natural and synthetic, which are elastomers at room temperatures, e.g., 20° to 25° C. The term "rubber" includes, therefore, natural or synthetic rubbers of the diene elastomer type generally used in preparing impact polymers. All such rubbers will form a two phase system with the polystyrene resin, and will comprise the discontinuous particulate gel phase in the impact resistant polystyrene resin composition. Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxy-terminated polybutadienes; poly-chlorobutadienes, e.g., neoprenes; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; and the like. The preferred rubbers comprise polybutadiene and rubbery copolymers of butadiene with styrene. Such preferred rubbers are widely used in forming rubber modified high impact polystyrene resins with the broad range of gel contents mentioned in the above-cited references.

The term "rubber modified polystyrene resin" defines a class of compounds comprising a two-phase system in which rubber is dispersed in a polystyrene resin matrix in the form of discrete particles. The particles can be formed by a mechanical blending of the rubber and the polystyrene resin and, if a cross-linking agent, e.g., sulfur is present, the particles will comprise a dispersed gelled elastomeric phase. On the other hand, and as is preferred, the two-phase system will consist of interpolymers of a styrene monomer and an elastomer or rubber. Commercially, such high impact polystyrenes are usually made by grafting of rubber in the presence of polymerizing styrene. Such systems consist of a continuous phase of the polymerized styrene monomer in which the rubber or elastomer is dispersed in a discontinuous elastomeric gel phase, in some cases without, but in most cases, and preferably, with grafted chains of polymerized vinyl aromatic, e.g., styrene, monomer. The particles will usually contain occluded, polymerized styrene monomer, too, and this can comprise up to about 50% of their weight, exclusive of grafted polystyrene.

Methods of preparing rubber modified polystyrenes of controlled elastomeric gel content are known. For example, in Amos et al, U.S. Pat. No. 2,694,692, polymerization of rubber in a solution of styrene monomer is carried out in bulk and the mixture is agitated during the beginning stages to form the desired amount of gel particles and then stirring is reduced and polymerization is completed. On the other hand, in the method of Stein et al, U.S. Pat. No. 2,886,553, a bulk pre-polymerization of rubber in a solution of styrene monomer is carried out with heating, agitating until the desired gel content is obtained then water and surfactants are added and polymerization is completed in suspension. The rate of agitation in the prepolymerization step in both processes controls the gel content. Merely by way of illustration, in a standard batch polymerization, in typical reaction equipment, stirring at 200 revolutions per minute (r.p.m.) with 7% polybutadiene dissolved in styrene monomer provides an 18% gel content; at 35 r.p.m., the gel content is 37%; and without stirring, the gel content is 80%. On the other hand, cross-linked or cross-linkable rubber and the polystyrene resin can be mechanically mixed under relatively severe shearing forces in, for example, an intensive mixer of the Banbury-type, until a rubber modified polystyrene with elastomer gel particles of the desired quantity are obtained.

The molecular weight distribution in the polystyrene resin matrix phase can be controlled in known ways. For example, $\overline{M}_w$ and $\overline{M}_n$ values of matrix of commercial thermally initiated polystyrenes are in the range of 250,000 and 70,000, respectively ($\overline{M}_w/\overline{M}_n = 3.6$). Blending in various amounts of polystyrene of $\overline{M}_w = 32,000$ or $\overline{M}_w = 300,000$, for example, will permit the polydispersity ($\overline{M}_w/\overline{M}_n$) to be varied. On the other hand, it is well within the skill of those working in this art to control the distribution by changing the process conditions. In this respect, broader distributions will be obtained, in general, if shorter reaction periods, increased catalyst amounts and higher reaction temperatures are used.

The rubber modified polystyrene resin used in this invention will comprise those in which the elastomeric phase comprises particles of polystyrene grafted elastomeric gel. Such resins will contain from about 22 to above about 80% by weight of particulate diene elastomer-styrene graft copolymer gel phase dispersed in a polystyrene resin matrix. If less than 22% of gel is present, much of the increased impact strength is lost. If more than 30% of gel is present, impact strength will still be excellent but surface appearance will deteriorate. The best properties are obtained if the gel content is from about 23.5 to about 25.5% dispersed in the polystyrene resin matrix. Especially preferably, in such resins, the elastomer will be derived from butadiene, from a butadiene styrene copolymer (e.g., 40-98% of butadiene and from 60 to 2% of styrene) or from a mixture thereof. All such materials can be made by well known methods, e.g., those cited above. They are also available commercially from a number of sources. Those with suitable gel contents and with suitable matrix molecular weight distributions can be selected on the basis of the test methods outlined above.

As is described in Cizek, U.S. Pat. No. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% polystyrene resin, on a rubber-free basis, and these are included within the scope of the invention. In general, compositions in which the polystyrene resin, on a rubber-free basis, comprises from 20 to 80% by weight of the polystyrene and the polyphenylene ether, are preferred because after molding they have the best combination of impact strength, surface appearance and resistance to solvents. Particularly useful and preferred are compositions in which the polystyrene resin, on a rubber-free basis, comprises from 40 to 60% by weight of the combined weight of the polystyrene and the polyphenylene ethers. Properties, such as flexural strength, tensile strength, hardness and especially impact strength appear to be at a maximum in such preferred compositions.

The rubber phase, i.e., the weight percentage of the dispersed elastomeric gel phase, in the instant compositions can vary, although no advantage is secured in exceeding a maximum of about 65% by weight of the total weight of the composition. If the elastomeric phase content falls below about 0.1% by weight, impact properties decline. The preferred range of elastomeric gel phase content is from about 4 to about 65% by weight, with the higher amount being used when the rubber is dispersed by mechanical blending. If, as is preferred, the rubber is in the form of an elastomeric polystyrene grafted gel, the lower amounts can be advantageous. In all cases, the preferred amount of elastomeric phase will range between 8 and 18% of the total weight of the composition. Although, at higher levels, impact strength is clearly optimized, other properties, such as solvent resistance and appearance of molded parts are affected. Because the grafted rubber particles provide compositions with better impact strengths than those from mechanically blended, i.e., ungrafted, but gelled, particles at the optimum level, 8 to 18% by weight, the compositions of this invention containing particulate styrene grafted elastomer gel phase are especially preferred.

The method used to form the polyphenylene ether-polystyrene-rubber compositions of the invention is not critical provided that it permits efficient dispersion and mixing. The preferred method is one in which the polyphenylene ether is mixed with a rubber modified polystyrene using any conventional mixing method and the composition so formed is molded to any desired shape such as by extrusion, hot molding, injection molding, and the like.

It should, of course, be obvious to those skilled in the art that other additives may be included in the present compositions such as plasticizers, pigments, flame retardant additives, reinforcing agents, such as glass filaments or fibers, stabilizers, and the like.

In addition, it is also within the scope of this invention to add other polymers to the composition, such as polyamides, polyolefins, polystyrene, and the like. It has been found, for example, that compositions of polyphenylene oxide and equal parts of polystyrene and a rubber modified polystyrene, with elastomer gel contents in the specified concentrations, have the impact strengths comparable to the prior art compositions having the same content of polyphenylene ether, but in which all of the polystyrene resin is rubber modified and has a elastomer gel content of below the critical level 22%, e.g., 19.8% by weight. Such compositions not only are more economical to produce than the prior art compositions but they also have improved surface appearance after injection molding.

DESCRIPTION OF THE PREFERRED EMBODIMENTS

The invention will be further illustrated by the following examples wherein, unless otherwise indicated, all compositions are prepared by passing mixtures of the polyphenylene ether, the styrene resin and the rubber or the high-impact polystyrene and other ingredients, if present, through a variable pitch, single screw extruder with extrusion temperature maintained between about 450° and 550° F. All parts are by weight. The strands emerging from the extruder are cooled, chopped into pellets and molded into test bars using standard procedures.

EXAMPLE 1

Fifty pounds of the following formulation is blended:

| Material | Parts |
| --- | --- |
| Poly(2,6-dimethyl-1,4-phenylene)ether(1) | 45 |
| Rubber modified polystyrene(2) | 55 |
| Polyethylene | 1.5 |
| Tridecylphosphite | 0.5 |
| Acrawax | .25 |
| Titanium dioxide | 2 |

(1)General Electric Company, PPO polyphenylene ether, in pellet form.
(2)High impact rubber modified polystyrene, in pellet form, containing about 9% by weight of polybutadiene in the form of a polystyrene grafted elastomeric gel phase dispersed in a matrix of polystyrene. The gel content is about 24.4% by weight (determined by dissolving out the soluble fraction with 1:1 volume of methyl ethyl ketone and acetone, centrifuging to separate the insolubles, drying and weighting). The number average molecular weight of the polystyrene in the matrix is about 60,000 and the weight average molecular weight is about 260,000 ($\overline{M}_w/\overline{M}_n = 4.34$).

The mixture is extruded in a 2½" Prodex extruder. The resultant strands are cooled, chopped into pellets and molded into test specimens. The elastomeric gel phase in the final composition constitutes about 14% by weight.
The following physical properties are obtained:

| Izod impact (ft.lbs./in. notch) | 5.7 |
| --- | --- |
| Gardner impact (in.-lbs.) | 240 |
| Elongation to failure (%) | 48 |
| Heat distortion temp. (264 psi)** F. | 254 |
| Tensile yield str. (psi) | 9,500 |
| Tensile ultimate str. (psi) | 8,400 |
| 45° Gloss value | 62 |
| Flexural modulus (psi) | 350,200 |
| Flexural modulus (psi) | 27,259 |

For purposes of comparison, the procedure of Example 1 is repeated substituting for the rubber modified high-impact polystyrene having dispersed 24.4% by weight elastomeric gel phase, a rubber modified high impact polystyrene having about a 19.8% by weight gel content and a $\overline{M}_w/\overline{M}_n$ of about 2.50. The composition contains, after mixing, elastomeric gel phase in an amount of about 10.4% by weight. The following physical properties are obtained:

| Izod impact (ft.lbs./in. notch) | 1.8 |
| --- | --- |
| Gardner impact (in.-lbs.) | 200 |
| Elongation to failure (%) | 51 |
| Heat distortion temp. (264 psi)° F. | 268 |
| Tensile yield str. (psi) | 9,700 |
| Tensile ultimate str. (psi) | 8,200 |
| 45° Gloss value | 59 |
| Flexural modulus (psi) | 380,900 |
| Flexural strength (psi) | 30,460 |

A comparison of the results demonstrates that at equal rubber contents, there has been obtained a substantial improvement in impact strength as measured in the Izod and Gardner tests as well as surface appearance (as indicated from the gloss value) in the composition which is prepared from the polystyrene containing more than 22 wt.% of elastomeric gel phase and having a polydispersity greater than 4.0 in comparison with that made from polystyrene containing less than 22% gel and with a narrower molecular weight distribution in the matrix. Similar results are obtained if the polystyrene contains 23.1, 24.6, 26.1, 24.4, 23.0 and 25.6% by weight of gel phase in comparison with one containing 20.5, 20.0, 19.7 and 19.2%, respectively. In addition, substantially the same enhancement in properties are obtained with matrix polydispersities of 4.32, 4.01, 4.37, 4.09, 4.11 and 4.54 in comparison with 2.62, 2.47, 2.80 and 2.43, respectively.

EXAMPLE 2

Fifty pounds of the following self-extinguishing formulation is blended:

| Material | Parts |
| --- | --- |
| Poly(2,6-dimethyl-1,4-phenylene)ether (PPO) | 50 |
| Rubber modified polystyrene (24.4% gel, Example 1) | 50 |
| Polyethylene | 1.5 |
| Triphenylphosphate | 3.0 |
| Tridecylphosphite | 1.0 |
| Zinc Sulfide | 1.5 |
| 30% Styrene Master Batch Black | 0.5 |

After extrusion in a 2-½" Prodex extruder, the strands are cooled, chopped and molded into test bars by conventional procedures. The gel content in the composition is about 13.1% by weight. The following physical properties are obtained:

| Izod impact (ft.lbs./in. notch) | 5.1 |
| --- | --- |
| Gardner impact (in.-lbs.) | 175 |
| Elongation to failure | 49 |
| Heat distortion temp. (264 psi)° F. | 251 |
| Tensile yield str. (psi) | 9,100 |
| Tensile ultimate str. (psi) | 8,200 |
| Flexural modulus (psi) | 341,800 |
| Flexural strength (psi) | 26,015 |

For comparative purposes, the procedure of Example 2 is repeated, substituting for the high-impact polystyrene having 24.4% by weight of dispersed elastomeric phase, one having about 19.8% by weight of gel content. The final composition has a gel content of about 10.7% by weight. The following physical properties are obtained:

| Izod impact (ft.lbs./in. notch) | 1.8 |
| --- | --- |
| Gardner impact (in.-lbs.) | 120 |
| Elongation to failure (%) | 40 |
| Heat distortion temp. (264 psi)° F. | 250 |
| Tensile yield str. (psi) | 9,350 |
| Tensile ultimate str. (psi) | 8,300 |
| Flexural modulus (psi) | 339,260 |
| Flexural strength (psi) | 30,860 |

A comparison of the results demonstrates a substantial improvement in impact strength in compositions containing dispersed elastomer prepared from polystyrenes containing the higher gel content (and broader matrix weight distribution).

EXAMPLE 3

Fifty pounds of the following self-extinguishing formulation is blended:

| Material | Parts |
| --- | --- |
| Polyphenylene ether (PPO) | 40 |
| High impact polystyrene (24.4% gel, see Example 1) | 60 |
| Polyethylene | 1.5 |
| Tridecylphosphite | 0.5 |

-continued

| Material | Parts |
| --- | --- |
| Triphenylphosphate | 9 |
| Teflon | 0.1 |

After extrusion in a 2-½" Prodex extruder, the strands are cooled, chopped and molded into test specimens by conventional procedures. The gel content in the final composition is about 16.2% by weight. The following physical properties are obtained:

| | |
| --- | --- |
| Izod impact (ft.lbs./in. notch) | 5.3 |
| Gardner impact (in.-lbs.) | >240 |
| Elongation to failure (%) | 55 |
| Heat distortion temp. (264 psi)° F. | 219 |
| Tensile yield str. (psi) | 8,000 |
| Tensile ultimate str. (psi) | 7,420 |
| 45° Gloss value | 61.5 |

For comparative purposes the procedure of Example 3 is repeated, substituting for the high-impact polystyrene having a gel content of 24.4%, one having a gel content of about 19.8% by weight. The following physical properties are obtained:

| | |
| --- | --- |
| Izod impact (ft.lbs./in. notch) | 1.8 |
| Gardner impact (in.-lbs.) | 50 |
| Elongation to failure (%) | 42 |
| Heat distortion temp. (264 psi)° F. | 210 |
| Tensile yield str. (psi) | 8,600 |
| Tensile ultimate str. (psi) | 7,200 |

A comparison of the results demonstrates a substantial improvement in impact strength in such comparisons containing polystyrene having a dispersed elastomer gel phase of about 24.4%.

EXAMPLE 4

Fifty pounds of the following formulation is blended:

| Material | Parts |
| --- | --- |
| Polyphenylene ether (PPO) | 30 |
| High-impact polystyrene (24.4% gel, see Example 1) | 70 |
| Polyethylene | 1.5 |
| Tridecylphosphite | 0.5 |
| Triphenylphosphate | 6 |

After extrusion in a 2½" Prodex extruder, the strands are cooled, chopped into pellets and molded into test specimens by conventional techniques. This composition, which is prepared from a rubber modified polystyrene having about 24.4% by weight dispersed gel phase has a higher impact strength (4.9 vs. 1.4) than that reported for similar compositions in the prior art, made from rubber modified polystyrene in which gel content typically is 12 to 20.7% by weight (Lustrex HT-88; Cizek, U.S. Pat. No. 3,383,435, Example 7 and FIG. 18; and Table 3 of Encyclopedia of Polymer Sci. and Tech., Vol. 11, cited above). The following physical properties are obtained:

| | |
| --- | --- |
| Izod impact (ft.lbs./in. notch) | 4.9 |
| Heat distortion temp. (264 psi)° F. | 227 |
| Elongation to failure (%) | 44 |
| Tensile yield str. (psi) | 7,500 |

EXAMPLE 5

Fifty pounds of the following formulation are blended:

| Material | Parts |
| --- | --- |
| Polyphenylene ether (PPO) | 25 |
| High-impact polystyrene (24.4% gel, see Example 1) | 75 |
| Polyethylene | 1.5 |
| Tridecylphosphite | 0.5 |
| Triphenylphosphate | 6 |

After extrusion in a 2½" Prodex extruder, the strands are cooled, chopped into pellets and molded into test specimens. The following physical properties are obtained:

| | |
| --- | --- |
| Izod impact (ft.lbs./in. notch) | 4.0 |
| Elongation to failure (%) | 34 |
| Heat distortion temp. (264 psi)° F. | 223 |
| Tensile yield str. (psi) | 7,500 |
| Tensile ultimate str. (psi) | 7,200 |

A similar composition from the prior art, but in which Monsanto HT-88 high-impact polystyrene was used, with gel content of about 20.7% by weight (Cizek, U.S. Pat. No. 3,383,435, Example 7 and FIG. 18) had an impact strength of only about 1.4 ft.lbs./in. notch.

Test bars prepared from the formulations of Examples 1 and 2 immersed in gasoline at 1% strain did not undergo catastrophic failure after 15 minutes when the polystyrene used in their preparation had an elastomer gel phase content of 24.4% by weight. By comparison, test bars prepared from the formulations wherein polystyrene had a gel content of 19.8% by weight all failed (catastrophic failure) in less than 15 seconds at 1% strain in gasoline.

EXAMPLE 6

The procedure of Example 1 is repeated, substituting for the polystyrene modified with polybutadiene, a polystyrene containing 9% by weight of rubber derived from a rubbery styrene butadiene copolymer containing 77% of butadiene units and 23% of styrene units, by weight. The gel content is about 24.5% by weight of the styrene matrix and gel, combined. The impact strength of the composition is high and comparable to that shown in Example 1.

EXAMPLE 7

The following polyphenylene ethers are substituted for poly(2,6-dimethyl-1,4-phenylene)ether in the formulation of Example 1:
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

The final compositions have properties similar to those exhibited by the composition of Example 1.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:
1. A high impact strength thermoplastic composition comprising
(a) a polyphenylene ether having the repeating structural formula:

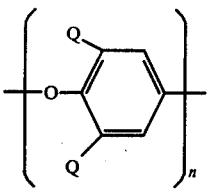

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus and
(b) a rubber modified polystyrene, said rubber modified polystyrene containing from not substantially less than about 22% to about 80% by weight of a particulate elastomeric gel phase dispersed in a polystyrene matrix.

2. A high impact strength thermoplastic composition comprising
(a) a polyphenylene ether having the repeating structural formula:

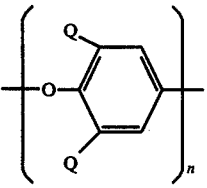

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus and
(b) a rubber modified polystyrene, said rubber modified polystyrene containing from about 22 to about 30% by weight of a particulte elastomeric gel phase dispersed in a polystyrene matrix.

3. A composition as defined in claim 2 wherein said rubber modified polystyrene contains from about 23.5 to about 25.5% by weight of said gel phase.

4. A composition as defined in claim 1 wherein said elastomeric gel phase comprises a polystyrene grafted diene elastomer.

5. A composition as defined in claim 4 wherein said elastomeric gel phase includes a minor proportion of up to 50% by weight of ungrafted polystyrene.

6. A composition as defined in claim 1 wherein said elastomeric gel phase comprises polybutadiene, a rubbery copolymer of butadiene and styrene or a mixture thereof.

7. A composition as defined in claim 1 wherein, in the polystyrene matrix, the ratio of weight average molecular weight to number average molecular weight is at least about 3.5.

8. A composition as defined in claim 7 wherein, in the polystyrene matrix, the ratio of weight average molecular weight to number average molecular is from about 3.5 to about 5.0.

9. A composition as defined in claim 1 wherein said polystyrene, on a rubber-free basis, comprises from 20 to 80% by weight of the combined weight of said polystyrene, on a rubber-free basis, and said polyphenylene ether.

10. A composition as defined in claim 9 wherein said polystyrene, on a rubber-free basis, comprises from 40 to 60% by weight of the combined weight of said polystyrene, on a rubber-free basis, and said polyphenylene ether.

11. A composition as defined in claim 1 wherein the elastomeric gel phase comprises from 4 to 65% of the total weight of said composition.

12. A composition as defined in claim 11 wherein the elastomeric gel phase comprises from 8 to 18% of the total weight of said composition.

13. A composition as defined in claim 1 wherein Q is alkyl having from 1 to 4 carbon atoms.

14. A composition as defined in claim 13 wherein Q is methyl.

* * * * *

UNITED STATES PATENT AND TRADEMARK OFFICE
CERTIFICATE OF CORRECTION

PATENT NO. : 4,128,603
DATED : December 5, 1978
INVENTOR(S) : Arthur Katchman and Gim F. Lee, Jr.

It is certified that error appears in the above-identified patent and that said Letters Patent are hereby corrected as shown below:

Column 6, line 62, "of" should be --for--.

Column 9, line 23, "weighting" should be --weighing--.

Column 9, line 39, "modulus" should be --strength--.

Column 10, line 32, after "failure" insert --(%)--.

Column 14, line 7, "particulte" should be --particulate--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

Disclaimer 4,128,603.—*Arthur Katchman*, Delmar and *Gim F. Lee, Jr.*, Albany, N.Y. COMPOSITIONS COMPRISING POLYPHENYLENE ETHER AND RUBBER MODIFIED POLYSTYRENE. Patent dated Dec. 5, 1978. Disclaimer filed Aug. 12, 1983, by the assignee, *General Electric Co.*

Hereby enters this disclaimer to claims 1, 2, 3, 4, 5, 6, 9, 10, 11, 12, 13 and 14 of said patent.

[*Official Gazette October 18, 1983.*]